United States Patent
Ko et al.

(10) Patent No.: US 11,394,044 B2
(45) Date of Patent: Jul. 19, 2022

(54) ANTIOXIDANT FOR FUEL CELLS, MEMBRANE ELECTRODE ASSEMBLY INCLUDING THE SAME AND METHOD FOR PREPARING ANTIOXIDANT

(71) Applicants: Hyundai Motor Company, Seoul (KR); Kia Motors Corporation, Seoul (KR)

(72) Inventors: Jae Jun Ko, Gyeonggi-do (KR); In Yu Park, Seoul (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 16/680,769

(22) Filed: Nov. 12, 2019

(65) Prior Publication Data
US 2020/0212469 A1 Jul. 2, 2020

(30) Foreign Application Priority Data
Dec. 28, 2018 (KR) .......................... 10-2018-0172105

(51) Int. Cl.
*H01M 8/1004* (2016.01)

(52) U.S. Cl.
CPC ................................ *H01M 8/1004* (2013.01)

(58) Field of Classification Search
CPC ............. H01M 8/1004; H01M 4/8663; H01M 8/1051; H01M 4/86; H01M 4/88; Y02E 60/50; Y02P 70/50
See application file for complete search history.

(56) References Cited

U.S. PATENT DOCUMENTS

| | | | |
|---|---|---|---|
| 2008/0050631 A1* | 2/2008 | Ito ....................... | H01M 8/1023 429/492 |
| 2014/0106260 A1* | 4/2014 | Cargnello ............ | B01J 35/0086 502/262 |
| 2016/0002531 A1* | 1/2016 | Zhang ................... | C09K 15/18 252/389.52 |
| 2016/0263557 A1* | 9/2016 | Bang .................... | B01J 35/0086 |
| 2019/0308884 A1* | 10/2019 | Christou ................ | C01F 17/30 |

* cited by examiner

*Primary Examiner* — Muhammad S Siddiquee
(74) *Attorney, Agent, or Firm* — Fox Rothschild LLP

(57) ABSTRACT

Disclosed are an antioxidant for fuel cells, a membrane electrode assembly including the same and a method for preparing the antioxidant. The antioxidant for fuel cells includes a core including at least one selected from the group consisting of a metal oxide ($M_xO_k$) and a complex metal oxide ($M_xN_yO_j$, N and M being different metals), and an outer portion (e.g., a shell) located on or over a surface of the core and formed by performing reduction treatment of the surface of the core using a thiourea-based compound. The outer portion includes metal cations ($M^{(x-n)+}$, n being a natural number of 1 or more) having a smaller oxidation number than a valency of the metal (M) of the core.

7 Claims, 5 Drawing Sheets

ANTIOXIDANT FOR FUEL CELLS, MEMBRANE ELECTRODE ASSEMBLY INCLUDING THE SAME AND METHOD FOR PREPARING ANTIOXIDANT

CROSS-REFERENCE TO RELATED APPLICATION

This application claims priority to and the benefit of Korean Patent Application No. 10-2018-0172105, filed on Dec. 28, 2018, the entire contents of which are incorporated herein by reference.

FIELD

The present invention relates to an antioxidant for fuel cells, a membrane electrode assembly including the same and a method for preparing the antioxidant.

BACKGROUND

In general, hydrogen and oxygen in air serving as reaction gas of a fuel cell cross over through an electrolyte membrane and thus promote generation of hydrogen peroxide (HOOH). Such hydrogen peroxide may generate oxygen-containing radicals with high reactivity, such as hydroxyl radicals (—OH) and hydroperoxyl radicals (—OOH). These radicals attack ionomers of a perfluorinated sulfonic acid-based electrolyte membrane and electrodes and may thus cause degradation of the electrolyte membrane and the electrodes, thereby reducing durability of the fuel cell.

As technology for mitigation of chemical degradation of the conventional electrolyte membrane and electrodes, a method for adding various kinds of antioxidants has been proposed. These antioxidants may be classified into a primary antioxidant functioning as a radical scavenger or quencher and a secondary antioxidant functioning as a hydrogen peroxide decomposer. Further, the primary antioxidant and the secondary antioxidant may be used independently or mixedly.

An electrolyte membrane to which an excessive amount of an antioxidant is added has increased chemical durability, but a sulfonated group in the electrolyte membrane is still combined with the cationic antioxidant and lowers hydrophilic properties, and thus, decreases proton conductivity and may cause performance reduction of a fuel cell. Therefore, appropriate use of antioxidants in consideration of performance and durability is required.

In the related art, a cerium oxide-based antioxidant may be introduced in the form of nano powder having a particle size of several nanometers or tens of nanometers, and the cerium oxide-based antioxidant is generally stored in an agglomerate state after preparation and thus requires a dispersion process before it is added to the electrolyte membrane. For example, a mechanical dispersion method, such as bead milling dispersion or ultrasonic dispersion, and a chemical dispersion method using a surfactant may be used.

One of the main properties of antioxidants is rapidly stabilize radicals. For instance, in order to have high antioxidant ability, when a cerium oxide-based antioxidant has a large surface area of particles and a high ratio (i.e., content) of trivalent cerium cations ($Ce^{3+}$) on the surface thereof, the cerium oxide-based antioxidant exhibits excellent hydroxyl radical stability by reaction formula 1 below.

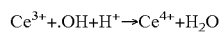

[Reaction Formula 1]

For this purpose, an antioxidant having a greater surface area may be introduced, but such an antioxidant may be easily agglomerated by Van der Waals' force. Further, the antioxidant may be dissolved during a process of manufacturing an electrolyte membrane under an acid atmosphere and thus cerium cations may be discharged to the outside of the fuel cell. Further, such an antioxidant may poison a cathode and thus lower performance and durability of the fuel cell. Therefore, development of an antioxidant having high antioxidant ability while having a particle size to secure dissolution stability is required.

The statements in this section merely provide background information related to the present invention and does not constitute prior art.

SUMMARY

In preferred aspects, provided is an antioxidant which is formed after surface-treatment using a reduction agent such as a thiourea-based compound.

Further, the present invention provides an antioxidant which has increased antioxidant ability by performing reduction treatment of a metal of the surface of the antioxidant.

Moreover, the present invention provides an antioxidant which has a particle size to secure dissolution stability as well as increased antioxidant ability so as to increase performance and durability of a membrane electrode assembly or a fuel cell including the antioxidant.

In one aspect, provided is an antioxidant for fuel cells. The antioxidant may include including a core including one or more selected from the group consisting of a metal oxide ($M_xO_k$) and a complex metal oxide ($M_xN_yO_j$, N and M being different metals), and an outer portion (e.g., a shell) located on or over a surface of the core and including metal cations ($M^{(x-n)+}$, n being a natural number of 1 or more) having a smaller oxidation number than a valency of the metal (M) of the core. Preferably, the outer portion (e.g., shell) may be formed by performing reduction treatment on the surface of the core using a reduction agent. For instance, the reduction agent may include a thiourea-based compound, and exemplary reduction agent may suitably include one or more selected from the group consisting of thiourea ($NH_2CSNH_2$), thiourea dioxide ($NH_2C(=NH)SO_2H$), 1,3-diisopropyl-2-thiourea (($CH_3)_2CHNHCSNHCH(CH_3)_2$), 1-(2-methoxyphenyl)-2-thiourea ($CH_3OC_6H_4NHCSNH_2$), propylene thiourea ($C_4H_8N_2S$) and 1-(2-furfuryl)-2-thiourea ($C_6H_8N_2O_s$).

Preferably, the metal (M) may suitably include cerium (Ce), the core may include a compound having tetravalent cerium cations ($Ce^{4+}$), and the outer portion (shell) may include a compound having trivalent cerium cations ($Ce^{3+}$).

Preferably, the complex metal oxide may suitably include one or more selected from the group consisting of cerium zirconium oxide, gadolinium doped cerium oxide, samarium doped cerium oxide, titania-supported cerium oxide and silica-supported cerium oxide.

A crystal size of each of the metal oxide and the complex metal oxide may be of about 5 nm to 100 nm as being measured by X-ray diffractometry (XRD) or a Brunauer-Emmett-Teller (BET) method.

Preferably, the antioxidant may form an agglomerated particles having a size of about 10 nm to 500 nm.

In a further preferred embodiment, the core may include cerium oxide ($CeO_2$) including trivalent cerium cations ($Ce^{3+}$), and the outer portion (e.g., shell) comprises $Ce_2O_3$ including tetravalent cerium cations ($Ce^{4+}$). The metals in the outer portions may be formed by performing reduction treatment of the surface of the core, for example, using thiourea ($NH_2CSNH_2$) as stated in reaction formula 2 below,

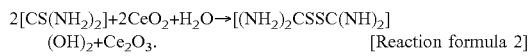
    [Reaction formula 2]

In another aspect, provided is a membrane electrode assembly including an electrolyte membrane and electrodes formed on both surfaces of the electrolyte membrane. Particularly, at least one of the electrolyte membrane or the electrodes may include the above-described antioxidant.

In another aspect, provided is a method for preparing an antioxidant for fuel cells. The method may include: preparing a first admixture including i) a metal component comprising one or more selected from the group consisting of a metal oxide ($M_xO_k$) and a complex metal oxide ($M_xN_yO_j$, N and M being different metals), and ii) deionized (DI) water; preparing a dispersion liquid by dispersing the first admixture; preparing a second admixture by the dispersion liquid and a reduction agent; reduction-treating the metal component on its surface; and drying the second admixture to obtain an antioxidant.

The antioxidant may have a core including the metal component and an outer portion (e.g., shell) including metal cations ($M^{(x-n)+}$, n being a natural number of 1 or more) having a smaller oxidation number than a valency of the metal (M) of each of the metal oxide ($M_xO_k$) and the complex metal oxide ($M_xN_yO_j$) in the core. Particularly, the outer portion may be formed on the reduction-treated surface of the antioxidant.

Preferably, the reduction agent may include a thiourea-based compound. The thiourea-based compound may suitably include one or more selected from the group consisting of thiourea ($NH_2CSNH_2$), thiourea dioxide ($NH_2C(=NH)SO_2H$), 1,3-diisopropyl-2-thiourea (($CH_3)_2CHNHCSNHCH(CH_3)_2$), 1-(2-methoxyphenyl)-2-thiourea ($CH_3OC_6H_4NHCSNH_2$), propylene thiourea ($C_4H_8N_2S$) and 1-(2-furfuryl)-2-thiourea ($C_6H_8N_2O_s$).

The term "surface treatment" may include a step of reduction, reducing reaction, reduction treatment for changing (e.g., reducing) the valency of the metals on the surface of core. In certain embodiments, the surface treatment refers to a chemical reaction by using a reductant or reduction agent to decrease the valency of the metals on the surface of the core thereby forming an outer portion such as a shell that surrounds at least in part of the core and the metals of the outer portion or shell have the different, i.e. decreased or less, valency from the metals in the core. In certain embodiments, the "surface treatments" may be used interchangeably with the "reduction treatment" or "reduction treating".

The preparing the dispersion liquid may include combining the first admixture and an ionomer dispersion liquid having a pH of about 2.5 or greater.

Preferably, the preparing the dispersion liquid may include using a nano disperser. The term "nano disperser" as used herein refers to an apparatus that disperses Preferably, the preparing the second admixture may be performed within a pH range of about 5 to 11.

Preferably, the preparing the second admixture may be performed within a temperature range of about 10° C. to 80° C. Preferably, the metal component comprises cerium oxide ($CeO_2$) and in the reduction treating, a reaction represented in Reaction formula 2 below may occur,

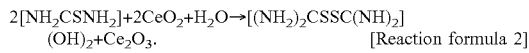
    [Reaction formula 2]

The method may further include preparing the reduction agent by mixing a thiourea-based compound, deionized (DI) water and a pH adjuster, prior to the preparing the second admixture.

Preferably, the reduction agent may be pretreated using hydrogen peroxide ($H_2O_2$) before the reduction-treating. For instance, the reduction agent is pretreated as a reaction represented in formula 4-1:

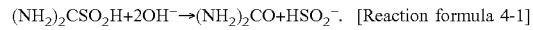 [Reaction formula 4-1]

Preferably, the reduction treating is performed by using the reaction product of formula 4-1 as a reaction represented by formula 4-2,

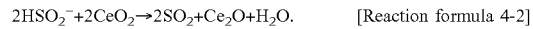 [Reaction formula 4-2]

Other aspects of the invention are discussed infra.

BRIEF DESCRIPTION OF THE DRAWINGS

In order that the disclosure may be well understood, there will now be described various forms thereof, given by way of example, reference being made to the accompanying drawings, in which.

Figure 1:
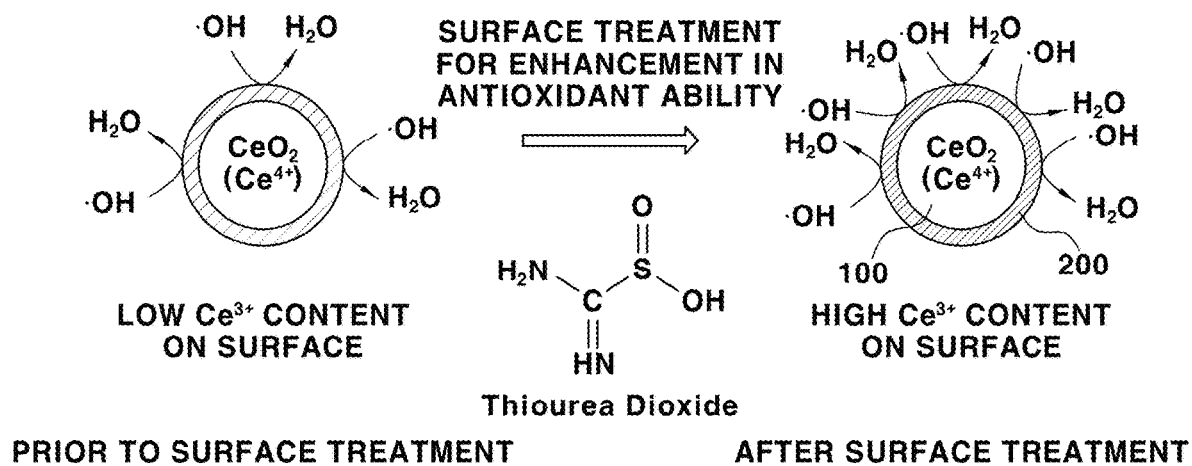
FIG. 1 schematically illustrates an antioxidant for fuel cells according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts throughout the several figures of the drawing.

The drawings described herein are for illustration purposes only and are not intended to limit the scope of the present disclosure in any way.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. In the following description of the embodiments, the same elements are denoted by the same reference numerals even though they are depicted in different drawings.

Unless stated as having other definitions, all terms (including technical and scientific terms) used in the following description of the embodiments will be interpreted as having meanings which those skilled in the art can understand. Also, terms which are defined in generally used dictionaries are not to be interpreted ideally or excessively unless clearly defined as having special meanings.

Also, terms used in the description of the embodiments serve merely to describe the embodiments and do not limit the present invention. In the description of the embodiments, singular expressions may encompass plural expressions, unless they have clearly different contextual meanings. In the following description of the embodiments, terms, such as "comprising", "including", "having", etc., will be interpreted as indicating the presence of characteristics, numbers, steps, operations, elements and/or parts stated in the description or combinations thereof, and do not exclude the presence of one or more other characteristics, numbers, steps, operations, elements and/or parts, combinations thereof or possibility of adding the same. In addition, the term "and/or" will be interpreted as including each of stated items and all combinations of one or more thereof.

Further, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. For instance, "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Hereinafter, the present invention will be described in detail with reference to the accompanying drawings.

In one aspect, provided is an antioxidant for fuel cells. The antioxidant may include i) a core including one or more selected from the group consisting of a metal oxide ($M_xO_k$) and a complex metal oxide ($M_xN_yO_j$, N and M being different metals); and ii) an outer portion or a shell located on or over a surface of the core and formed and comprising metal cations ($M^{(x-n)+}$, n being a natural number of 1 or more) having a smaller oxidation number than a valency of the metal (M) of the core. A metal component in the core refers to the one or more of the metal oxide and the complex metal oxide, which may be used interchangeably.

FIG. 1 schematically illustrates an exemplary antioxidant for fuel cells according to an exemplary embodiment of the present invention.

As shown in FIG. 1, the antioxidant for fuel cells may include a core 100 including at least one selected from the group consisting of a metal oxide ($M_xO_k$) and a complex metal oxide ($M_xN_yO_j$, N and M being different metals), and an outer portion (shell) 200 located on the surface of the core 100. In particular, the outer portion (shell) may be formed by performing reduction treatment of the surface of the core 100 using a reduction agent. The rejection agent may suitably include a thiourea-based compound. Particularly, the outer portion (shell) 200 may include metal cations ($M^{(x-n)+}$, n being a natural number of 1 or more) having a smaller oxidation number than the valency of the metal M included in the core 100.

The complex metal oxide included in the core 100 may include one or more selected from the group consisting of cerium zirconium oxide, gadolinium doped cerium oxide, samarium doped cerium oxide, titania-supported cerium oxide and silica-supported cerium oxide, without being limited thereto so that various kinds of metal oxides and complex metal oxides except for metal salt hydrates may be used. Preferably, in order to achieve the most excellent antioxidant ability, the metal M may include cerium (Ce), manganese (Mn), or a combination thereof.

A crystal size of the metal oxide or the complex metal oxide which is measured by, for example, X-ray diffractometry (XRD) or a Brunauer-Emmett-Teller (BET) method, may be of about 5 nm to 100 nm. Particularly, the metal oxide or the complex metal oxide may include cerium (Ce), i.e., cerium oxide or complex cerium oxide may be used, and a crystal size of the cerium oxide or the complex cerium oxide, which is measured by X-ray diffractometry (XRD) or the Brunauer-Emmett-Teller (BET) method, may be of about 5 nm to 100 nm.

A particle size obtained by agglomerating antioxidants for fuel cells according to various exemplary embodiments of the present invention may be of about 10 nm to 500 nm. Such a particle size may mean the size of agglomerated particles by attraction between particles of the antioxidant. When the particle size of the antioxidant is several nanometers (nm), the antioxidant may have high antioxidant ability due to a large surface area and also have a high dissolving property. Preferably, the antioxidant may have an agglomerated particle size of about 10 nm or greater so as to have both dissolution stability and excellent antioxidant ability.

In the metal oxide or the complex metal oxide included in the antioxidants according to various exemplary embodiments of the present invention, the metal M may include, for example, cerium (Ce). Particularly, cerium oxide ($Ce_xO_k$) may be used as the metal oxide.

As shown in FIG. 1, the core 100 of the antioxidant after surface treatment may include a compound having tetravalent cerium cations ($Ce^{4+}$), and the outer portion (shell) 200 of the antioxidant after surface treatment may include a compound having trivalent cerium cations ($Ce^{3+}$). The outer portion (shell) 200 may include trivalent cerium cations ($Ce^{3+}$), which are reduced from tetravalent cerium cations ($Ce^{4+}$) included in the core 100 so as to have an oxidation number decreased from the oxidation number of tetravalent cerium cations ($Ce^{4+}$) by 1.

Accordingly, the antioxidant according to an exemplary embodiment of the present invention may rapidly perform stabilization of radicals (OH) and have increased antioxidant ability. When the ratio of trivalent cerium cations ($Ce^{3+}$) on the outer portion (shell) 200 of the antioxidant including cerium oxide is increased, the above-described reaction formula 1 is increased and, thus, the antioxidant may have higher hydroxy radical stabilizing ability and higher antioxidant ability.

When the surface of the core 100 of the antioxidant is treated so as to form the outer portion (shell) 200, the thiourea-based compound may function as a reductant or reduction agent. The thiourea-based compound basically may include carbon (C), an amine group (—$NH_2$) or an amino group (—NH—) including nitrogen, and sulfur (S).

For example, the thiourea-based compound may include one or more selected from the group consisting of thiourea ($NH_2CSNH_2$), thiourea dioxide ($NH_2C(=NH)SO_2H$), 1,3-diisopropyl-2-thiourea (($CH_3)_2CHNHCSNHCH(CH_3)_2$), 1-(2-methoxyphenyl)-2-thiourea ($CH_3OC_6H_4NHCSNH_2$), propylene thiourea ($C_4H_8N_2S$) and 1-(2-furfuryl)-2-thiourea ($C_6H_8N_2O_s$). However, other kinds of thiourea-based compounds to increase the ratio of trivalent cerium cations ($Ce^{3+}$) on the surface (outer portion or shell 200) of the antioxidant are not excluded.

Hereinafter, reducibility of the thiourea-based compound will be exemplarily described in more detail with reference to FIGS. 2A and 2B.

Figure 2A:
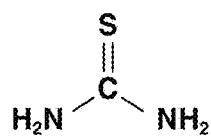
FIGS. 2A and 2B show exemplary thiourea-based compounds which are applicable to several embodiments of the present invention.
Figure 2B:
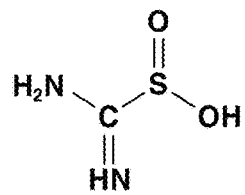

FIG. 2A illustrates a molecular structure of thiourea ($NH_2CSNH_2$) as the thiourea-based compound, and FIG. 2B illustrates thiourea dioxide ($NH_2C(=NH)SO_2H$) as the thiourea-based compound. The two thiourea-based compounds shown in FIGS. 2A and 2B are organic compounds which include carbon (C), nitrogen (N), sulfur (S) and hydrogen (H) and have colorless crystals.

As shown in FIG. 2A, thiourea ($NH_2CSNH_2$) has a structure in which oxygen (O) of the molecular structure of urea is substituted by sulfur (S), and has a molecular weight of 73.12 g/mol and a solubility of 142 g/L at a temperature of 25° C. to be easily dissolved in water, and a thiourea aqueous solution is close to neutral. Thiourea itself may have antioxidant ability which may stabilize hydroxyl radicals.

For example, when the core 100 (in FIG. 1) includes cerium oxide ($CeO_2$) and thiourea ($NH_2CSNH_2$) is used for surface treatment of the core 100, the outer portion (shell) 200 (in FIG. 1) may be formed, for example, by performing reduction treatment of the surface of the core 100 using thiourea ($NH_2CSNH_2$), as stated in reaction formula 2 below.

$2[NH_2CSNH_2]+2CeO_2+H_2O \rightarrow [(NH_2)_2CSSC(NH)_2]$
$(OH)_2+Ce_2O_3$     [Reaction formula 2]

As stated in reaction formula above, on the surface of the core 100, cerium oxide ($Ce_2O_3$) including trivalent cerium cations ($Ce^{3+}$) may be produced from cerium oxide ($CeO_2$) including tetravalent cerium cations ($Ce^{4+}$) by thiourea ($NH_2CSNH_2$). Because the ratio of trivalent cerium cations ($Ce^{3+}$) on the surface of the core 100, i.e., the outer portion (shell) 200, is increased, the above-described reaction formula 1 may be vigorously performed, the antioxidant may have excellent hydroxy radical stabilizing ability and excellent antioxidant ability.

As shown in FIG. 2B, the thiourea-based compound according to an exemplary embodiment of the present invention may be pretreated prior to reduction treatment of the surface of the core 100, and thiourea dioxide ($NH_2C(=NH)SO_2H$) shown in FIG. 2B may be used as one example.

For example, reduction treatment of cerium oxide ($CeO_2$) included in the surface of the antioxidant according to an exemplary embodiment of the present invention may be carried out by directly performing surface treatment of the antioxidant using thiourea ($NH_2CSNH_2$), as stated in reaction formula 2, or by preparing thiourea dioxide ($NH_2C(=NH)SO_2H$) through pretreatment using hydrogen peroxide ($H_2O_2$) and then performing surface treatment of the antioxidant using thiourea dioxide ($NH_2C(=NH)SO_2H$).

Preferably, thiourea dioxide ($NH_2C(=NH)SO_2H$) may be prepared through pretreatment by adding hydrogen peroxide ($H_2O_2$) to thiourea ($NH_2CSNH_2$) shown in FIG. 2A, as stated in reaction formula 3 below.

$NH_2CSNH_2+2H_2O_2 \rightarrow (NH_2)C(=NH)SO_2H)+2H_2O$   [Reaction formula 3]

Thiourea ($NH_2C(=NH)SO_2H$) has a molecular weight of 108.12 g/mol and a solubility of 30 g/L at a temperature of 25° C. Further, thiourea dioxide ($NH_2C(=NH)SO_2H$) has crystals with a color close to white, as compared to thiourea ($NH_2CSNH_2$), is easily dissolved in water and may thus react in the form of an aqueous solution in the same manner as thiourea ($NH_2CSNH_2$). Therefore, thiourea dioxide ($NH_2C(=NH)SO_2H$) may be easily applied to surface treatment of a particle-type antioxidant which is dispersed in deionized (DI) water. Further, thiourea dioxide ($NH_2C(=NH)SO_2H$), may have all properties of both of hydrogen peroxide ($H_2O_2$) and thiourea ($NH_2CSNH_2$) and function as a reductant or a reduction agent. Also, thiourea dioxide ($NH_2C(=NH)SO_2H$), is referred to as formamidine sulfinic acid and is known as an organic sulfur compound serving as an eco-friendly material which is widely used in textile manufacturing.

When the core 100 includes cerium oxide ($CeO_2$) and thiourea dioxide ($NH_2C(=NH)SO_2H$) is used for surface treatment of the core 100, the outer portion (shell) 200 may be formed, for example, by performing reduction treatment of the surface of the core 100 using thiourea dioxide ($NH_2C(=NH)SO_2H$), obtained by performing pretreatment using hydrogen peroxide ($H_2O_2$), as stated in reaction formula 4-1 below.

$(NH_2)_2CSO_2H+2OH^- \rightarrow (NH_2)_2CO+HSO_2^-$   [Reaction formula 4-1]

As stated in reaction formula 4-1 above, thiourea dioxide ($NH_2C(=NH)SO_2H$) and hydroxy ions (OH—) may be reacted with each other in an aqueous solution to produce urea (($NH_2)_2CO$) and sulfoxylate ions ($HSO_2^-$).

Thereby, the outer portion (shell) 200 may be formed by performing reduction treatment of the surface of the antioxidant including cerium oxide ($CeO_2$) using thiourea dioxide ($NH_2C(=NH)SO_2H$), as stated in reaction formula 4-2 below.

$2HSO_2^-+2CeO_2 \rightarrow 2SO_2+Ce_2O_3+H_2O$   [Reaction formula 4-2]

When sulfoxylate ions ($HSO_2^-$) and cerium oxide ($CeO_2$) including tetravalent cerium cations ($Ce^{4+}$) may be reacted with each other, as stated in reaction formula 4-2, sulfur dioxide ($SO_2$) and cerium oxide ($Ce_2O_3$) including trivalent cerium cations ($Ce^{3+}$) may be produced.

Further, thiourea ($NH_2CSNH_2$) and thiourea dioxide ($NH_2C(=NH)SO_2H$) have similar chemical properties to urea, and may thus be decomposed to ammonia ($NH_3$) and sulfur dioxide ($SO_2$) by heat and water. Ammonia ($NH_3$) and sulfur dioxide ($SO_2$) may be easily dissolved and discharged during driving of the fuel cell. Therefore, even if small amounts of ammonia ($NH_3$) and sulfur dioxide ($SO_2$) remain on the surface (i.e., the outer portion or shell 200) of the antioxidant, they do not influence performance of the fuel cell.

Figure 3:
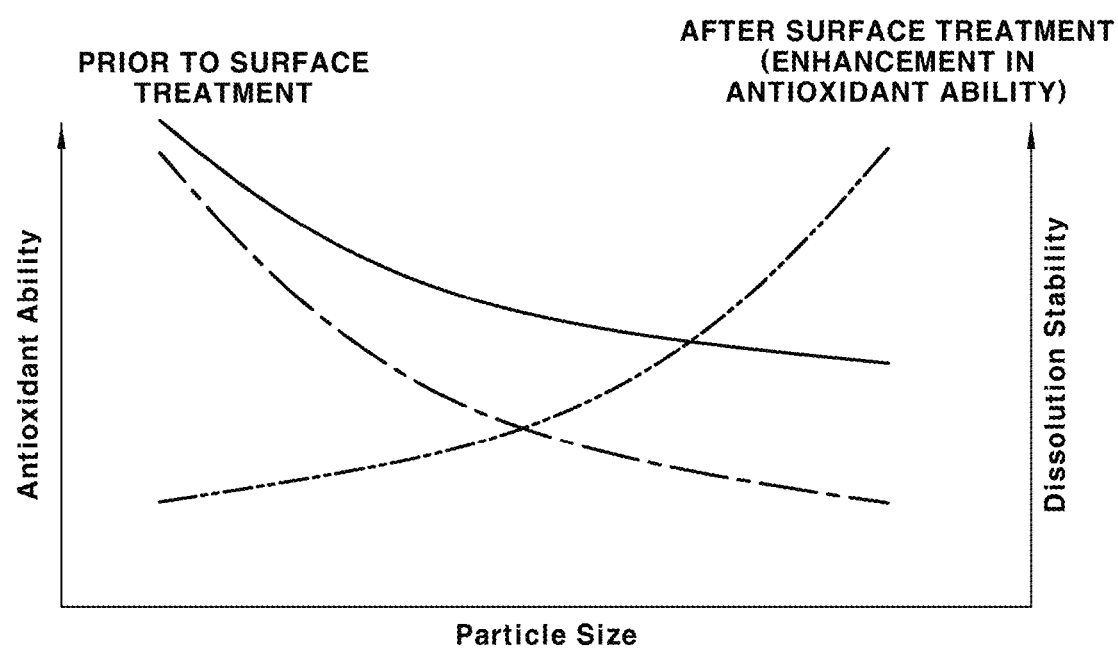
FIG. 3 is a graph comparatively illustrating characteristics of exemplary antioxidants according to exemplary embodiments of the present invention.

FIG. 3 is a graph comparatively illustrating characteristics of antioxidants according to various exemplary embodiments of the present invention.

The graph of FIG. 3 shows expected property changes of antioxidants, trivalent cerium cation ($Ce^{3+}$) contents of which are increased by performing reduction treatment of cerium oxide ($CeO_2$) on the surfaces of the antioxidants using thiourea dioxide ($NH_2C(=NH)SO_2H$). If the content of trivalent cerium cations ($Ce^{3+}$) converted from cerium oxide ($CeO_2$) of the antioxidant is increased using thiourea dioxide ($NH_2C(=NH)SO_2H$), antioxidant ability of the antioxidant to stabilize hydroxyl radicals may be enhanced.

Further, since antioxidant ability of the antioxidant is enhanced but the particle size of the antioxidant is not changed, dissolution stability of the antioxidant may be maintained during driving of a fuel cell. As consequence, the fuel cell may be manufactured by preparing an electrolyte membrane and electrodes including the above-described antioxidant and then providing the electrodes to both surfaces of the electrolyte membrane, and the manufactured fuel cell (the electrolyte membranes and the electrodes) may have increased chemical durability as compared to a fuel cell using the conventional antioxidant. Particularly, since the ionomer of the electrolyte membrane and the electrodes of the membrane electrode assembly for fuel cells may have a selective delivery function of protons (hydrogen ions), as the content of trivalent cerium cations ($Ce^{3+}$) on the surface of the antioxidant included in the electrolyte membrane and the electrodes is increased, antioxidant ability of the antioxidant is increased, and consequently, the fuel cell may have enhanced performance and chemical durability and an extended lifespan.

Figure 4:
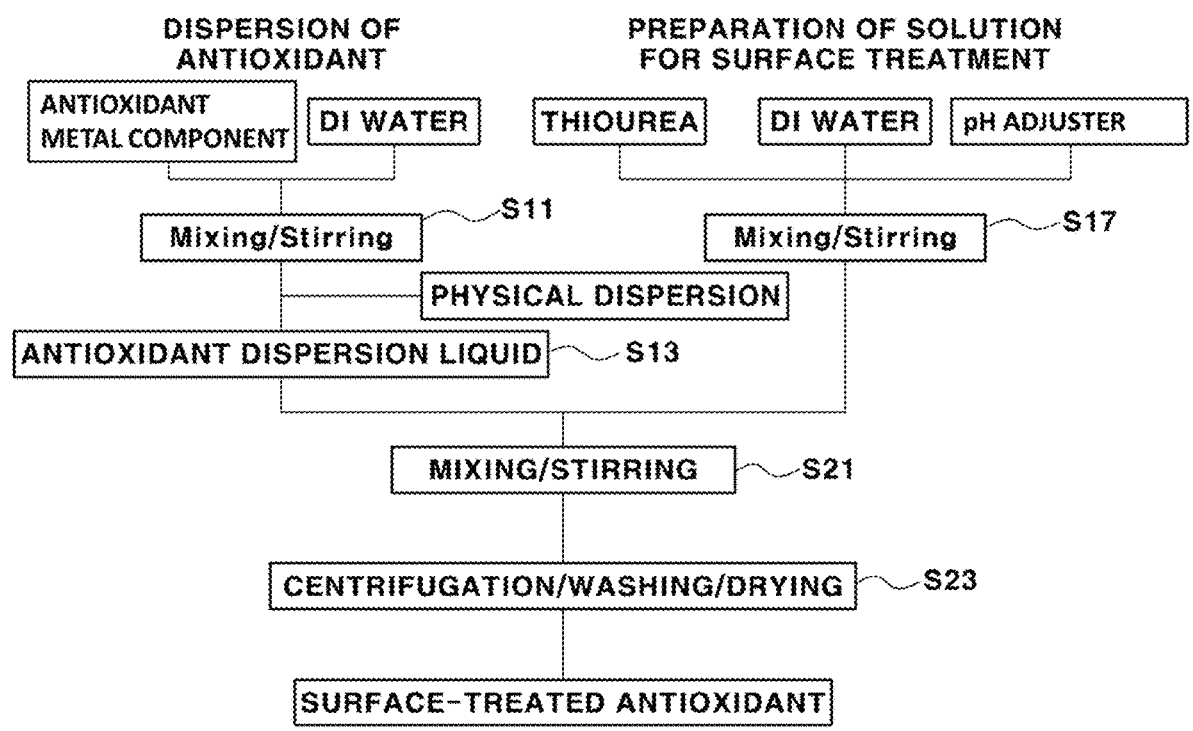
FIG. 4 is a flowchart illustrating an exemplary method for preparing an exemplary antioxidant for fuel cells according to various exemplary embodiments of the present invention.

FIG. 4 is a flowchart illustrating an exemplary method for preparing an antioxidant for fuel cells according to several embodiments of the present invention. For convenience of description, a detailed description of some parts in this figure, which are substantially the same as those in FIGS. 1 to 3, will be omitted because it is considered to be unnecessary.

In another aspect, provided is a method of preparing an antioxidant for fuel cells. The method may comprises preparing a first admixture comprising a metal component and preparing a second mixture including a reduction agent. The metal component may be present in a form of particle, having the predetermined size, for instance, of about 5 nm to 100 nm measured by X-ray diffractometry (XRD) or the Brunauer-Emmett-Teller (BET) method.

The dispersion may include the metal component, which is a metal oxide ($M_xO_k$) and a complex metal oxide ($M_xN_yO_j$, N and M being different metals), as an antioxidant precursor, which is further subjected to surface treatment. The second admixture may include the reduction agent including a thiourea-based compound, DI water and pH adjuster.

For instance, as shown in FIG. 4, the preparation method may include preparing an dispersion solution comprising a metal component (S11 and S13), preparing a reductant agent for surface treatment (S17), and preparing the antioxidant, the surface of which is reduction-treated, by mixing the solution for surface treatment with the antioxidant dispersion liquid (S21 and S23).

The preparation method according to various exemplary embodiments of the present invention may include preparing a first admixture including the metal component (e.g., a metal oxide and a complex metal oxide), which may constitute a core of the antioxidant, and DI water (S11), for example, by mixing thereof, preparing a dispersion liquid including the antioxidant by dispersing the first mixed liquid (S13), preparing a second admixture including the dispersion liquid and a reduction agent, for example, by mixing thereof so as to reduce the surface of the antioxidant (S21), and preparing the antioxidant, the surface of which was reduction-treated, by drying the second mixed liquid (S23). Preferably, the reduction agent may suitably include a thiourea-based compound.

The outer portion (shell) 200 including metal cations ($M^{(x-n)+}$, n being a natural number of 1 or more) having a smaller oxidation number than the valency of the metal M included in the metal oxide ($M_xO_k$) or the complex metal oxide ($M_xN_yO_j$) in the core may be formed on the surface of the antioxidant, reduction treatment of which was completed.

The preparing the dispersion liquid including the metal component (S13) may include putting the prepared first mixed liquid into an ionomer dispersion liquid having a pH of about 2.5 or greater. For instance, a particle-type antioxidant including cerium oxide or complex cerium oxide may be dispersed in an aqueous solution and then a prepared mixed liquid may be put into an ionomer dispersion liquid (for example, an ionomer dispersion liquid included in an electrolyte membrane or electrodes) having a pH of about 2.5 or greater. Since, when the mixed liquid is put into the ionomer dispersion liquid having a pH of less than about 2.5, dissolution stability of the antioxidant may be lowered, and the mixed liquid may suitably be put into the ionomer dispersion liquid having a pH of about 2.5 or greater.

Further, in the preparing the dispersion liquid including the antioxidant (S13), dispersion of the antioxidant may be performed using a nano disperser. For example, the antioxidant may be dispersed using the nano disperser under conditions of D50 through 6-cycle dispersion so that the particle size of the antioxidant is reduced from about 3 μm to about 0.2 μm.

Further, in the preparing the second mixed liquid (S21), proper amounts of the antioxidant dispersion liquid and the solution for surface treatment may be mixed and stirred for a proper time (for example, 4 hours), and thereafter a centrifugal process may be performed to produce solids. Further, after the preparing the second mixed liquid (S21), washing and drying processes may be performed, thereby finally preparing the antioxidant including the metal oxide (for example, cerium oxide) or the complex metal oxide having an increased content of trivalent cerium cations ($Ce^{3+}$).

Particularly, the preparing the second mixed liquid (S21), i.e., surface treatment of the antioxidant, according to various exemplary embodiments of the present invention may be performed within a pH range of about 5 to 11. When surface treatment of the antioxidant is performed within a pH range of about 3 or less or a pH range of about 11 or greater, there may be difficulty in handling substances during preparation of the antioxidant. Therefore, surface treatment of the antioxidant may be performed within a pH range of about 5 to 11, or particularly, within a pH range of about 6 to 8. When surface treatment of the antioxidant is performed within a pH range of about 6 to 8, a small amount of the antioxidant may exhibit magnificent effects under conditions close to neutral. Alternatively, the surface treatment of the antioxidant may be performed in a pH range of about 8 to 9, i.e., under weakly basic conditions.

Further, the preparing the second admixture (S21) may be performed within a temperature range of about 10° C. to 80° C. Since the liquid may be evaporated under temperature conditions of about 80° C. or greater, the preparing the second admixture (S21) may be performed at a temperature of less than about 80° C. Further, surface treatment of the antioxidant may be sufficiently performed in a room temperature atmosphere. Further, at a lower temperature than room temperature, surface treatment effects may be reduced and a cooling process may be required. Further, within the above temperature range, as temperature increases, antioxidant ability of the antioxidant may be increased. Therefore, surface treatment and reaction related thereto (S21) may be performed within a temperature range of room temperature to about 80° C., or particularly, within a temperature range of room temperature to 60° C.

When the antioxidant includes cerium oxide ($CeO_2$) in the preparing the first admixture (S11), for example, the reaction stated in reaction formula 2 above may be performed in the preparing the second admixture (S21).

After the reaction, cerium oxide ($Ce_2O_3$) including trivalent cerium cations ($Ce^{3+}$) may be produced from cerium oxide ($CeO_2$) including tetravalent cerium cations ($Ce^{4+}$) by thiourea ($NH_2CSNH_2$), on the surface of the antioxidant. Thus, the content of trivalent cerium cations ($Ce^{3+}$) on the surface of the antioxidant may be increased and, thus antioxidant ability of the antioxidant may be increased.

Further, as shown in FIG. 4, the preparation method according to various exemplary embodiments of the present invention may further include preparing the solution for surface treatment including a reduction agent, e.g., thiourea-based compound, by mixing with deionized (DI) water and a pH adjuster (S17), prior to the preparing the second admixture (S21).

For example, a solution for surface treatment may be prepared using thiourea dioxide ($NH_2C(=NH)SO_2H$) as the thiourea-based compound (S17). In the preparing the solution for surface treatment (S17), an amount of thiourea dioxide ($NH_2C(=NH)SO_2H$) in a solid state, which is within a solubility, may be put into DI water to prepare the solution for surface treatment, and the pH adjuster may be additionally added to the solution for surface treatment and the solution for surface treatment may be stirred so that the pH of the solution for surface treatment may be adjusted. As the pH adjuster, various kinds of substances having various contents, such as sulfuric acid and sodium hydroxide, may be used.

Further, the preparing the solution for surface treatment (S17) may include pretreating the solution for surface treatment using hydrogen peroxide ($H_2O_2$). That is, the solution for surface treatment, which was pretreated using hydrogen peroxide ($H_2O_2$), may be prepared (S17), prior to the preparing the second admixture (S21).

For example, by performing pretreatment, thiourea ($NH_2CSNH_2$) may be pretreated using hydrogen peroxide ($H_2O_2$) to produce thiourea dioxide ($NH_2C(=NH)SO_2H$), as stated in reaction formula 4-1 described above. Thereby, in the preparing the second admixture (S21), the antioxidant, the surface of which has an increased content of trivalent cerium cations ($Ce^{3+}$), may be prepared, as stated in reaction formula 4-2.

EXAMPLE

Hereinafter, the present invention will be described in more detail through the following examples and comparative example. The following examples serve merely to exemplarily describe the present invention and are not intended to limit the scope of the invention.

Manufacturing Example: Manufacture of
Antioxidant Including Metal Oxide,
Surface-Treated Using Thiourea-Based Compound 1-1) Thiourea-Based Compound In the manufacturing example, thiourea dioxide (CAS number: 1758-73-2), manufactured by Sigma Aldrich Corp., was dissolved in an aqueous solution and then used to perform surface treatment of an antioxidant.

1-2) Antioxidant

In the manufacturing example, among metal oxides, cerium oxide (CAS number: 1306-38-3) having a crystal size of 25 nm measured by X-ray diffractometry (XRD) was used as an antioxidant.

1-3) Manufacturing Process

First, in preparing an antioxidant dispersion liquid, dispersion of the particle-type antioxidant was performed using a nano disperser, and in this case, the antioxidant was dispersed using the nano disperser under conditions of D50 through 6-cycle dispersion so that the particle size of the antioxidant is reduced from about 3 μm to about 0.2 μm.

Further, in preparing a solution for surface treatment, an amount of thiourea dioxide ($NH_2C(=NH)SO_2H$) in a solid state, which is within a solubility, was put into deionized (DI) water to prepare a thiourea dioxide solution, and various contents of 0.1 M sulfuric acid and 0.1 M sodium hydroxide as pH adjusters were additionally added to the thiourea dioxide solution and then the thiourea dioxide solution was stirred so that the pH of the thiourea dioxide solution may be adjusted to a set value.

Thereafter, in mixing the antioxidant dispersion liquid and the solution for surface treatment and performing surface treatment, samples of the antioxidant dispersion liquid and the thiourea dioxide solution serving as the solution for surface treatment were prepared according to respective admixtures and then mixed and stirred for 4 hours, and a centrifugal process was performed to produce solids. Thereafter, a washing process using DI water and a drying process were performed, and thereby, cerium oxide having an increased content of trivalent cerium cations ($Ce^{3+}$) by thiourea dioxide was obtained.

1-3) Manufacturing Examples and Comparative
Example

An antioxidant of comparative example 1 was prepared by dispersing cerium oxide in an aqueous solution using DI water without surface treatment using thiourea dioxide, performing a centrifugal process to produce solids and drying particles of the solids.

In antioxidants of examples 1 to 5, prepared by the above-described preparation method, 10 g of a 1% antioxidant dispersion liquid was used. Further, in order to increase a content of trivalent cerium cations ($Ce^{3+}$), a 2% thiourea dioxide solution was prepared, and 0.25 g, 0.50 g, 1.00 g, 2.00 g and 5.00 g of the thiourea dioxide solution were respectively mixed with the antioxidant dispersion liquid to prepare cerium oxide-thiourea dioxide admixtures in examples 1, 2, 3, 4 an 5. By stirring the prepared admixtures at room temperature for 4 hours and then performing a centrifugal process, a washing process using DI water and a drying process at a temperature of 80° C., cerium oxides, surface treatment of which was completed, were prepared.

Figure 5:
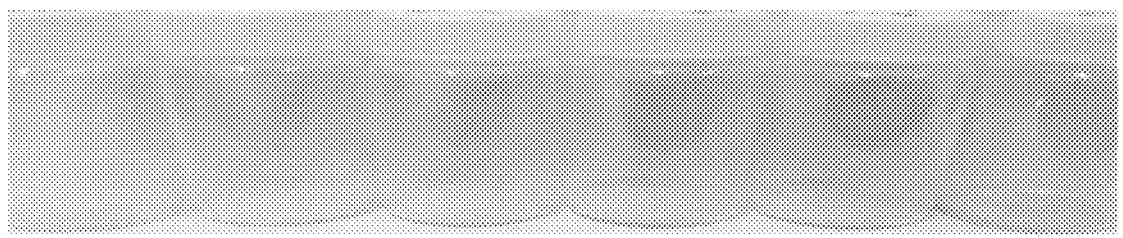
FIG. 5 shows results of evaluation example 1 according to an exemplary embodiment of the present invention.

Evaluation Example 1: Results of Surface Treatment of Cerium Oxides According to Thiourea Dioxide Contents FIG. 5 is an image showing the cerium oxides in which surface treatment using thiourea dioxide was completed according to the above manufacturing example. From the left side of FIG. 5, samples of comparative example and examples 1 to 5 manufactured according to the manufacturing example are shown in order.

As exemplarily shown in FIG. 5, it may be confirmed that, as the contents of thiourea dioxides are increased during surface treatment, the colors of the surfaces of the cerium oxides become darker from light yellow to dark yellow, further to light brown.

Evaluation Example 2: Evaluation of Antioxidant Abilities of Cerium Oxides According to Thiourea Dioxide Contents 2-1) Test Conditions In order to quantify antioxidant properties of antioxidants, various methods may be applied. In this evaluation example, antioxidant properties of the antioxidants were compared using methyl violet (MV) (CAS number: 8004-87-3), manufactured by Sigma Aldrich Corp., iron(II) sulfate heptahydrate ($FeSO_4 \cdot 7H_2O$) (CAS number: 7782-63-0), manufactured by Sigma Aldrich Corp., and hydrogen peroxide ($H_2O_2$) (CAS number: 7722-84-1), manufactured by Sigma Aldrich Corp. In order to prepare a reagent, 0.5 g of $9.0 \times 10^{-3}$ M iron(II) sulfate heptahydrate and 0.5 g of $9.0 \times 10^{-3}$ M hydrogen peroxide were mixed in 20 ml vials to produce hydroxyl radicals, 3 mg of cerium oxides, which were prepared in advance, were put into the respective containers, and then 9 g of $2 \times 10^{-5}$ M methyl violet was put into the respective containers, thus producing 10 g of antioxidant samples to verify antioxidant properties. Confirmation of discoloration of the samples was performed after 24 hours and, after removal of cerium oxide deposits, properties of the samples were quantified using a UV-vis spectrometer (Hitachi U-2900).

2-2) Evaluation Results

Figure 6:
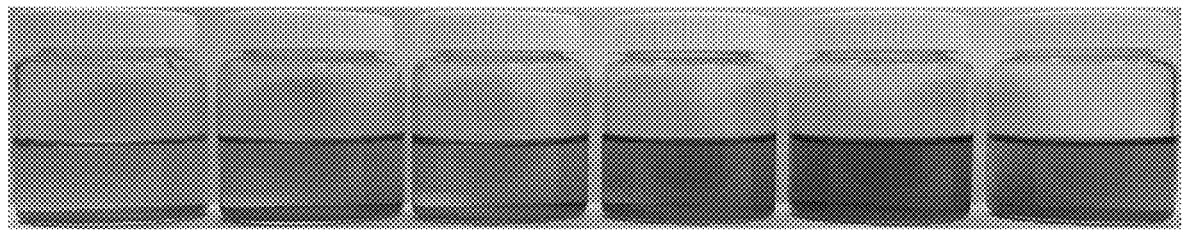
FIG. 6 shows results of evaluation example 2 according to an exemplary embodiment of the present invention.

As shown in FIG. 6, whether or not hydroxyl radicals are stabilized by the antioxidants and degrees of stabilization of hydroxyl radicals may be determined from evaluation results obtained using methyl violet. Methyl violet is originally violet, but when reaction by hydroxyl radicals proceeds, methyl violet loses its original color and becomes colorless while stabilizing hydroxyl radicals. Therefore, if hydroxyl radicals are stabilized in advance by an antioxidant, methyl violet shows its original color, i.e., violet, and radical stabilization ability, i.e., antioxidant ability, of the antioxidant may be determined according to an intensity of the color exhibited by methyl violet. For reference, such an evaluation method is similar to the method of a Fenton test which is one of chemical durability tests of electrolyte membranes of fuel cells.

As exemplarily shown in FIG. 6, degrees of antioxidant abilities of the cerium oxides according to whether or not surface treatment using thiourea dioxide is performed may be evaluated according to colors of methyl violet serving as a reagent. The colors of the reagent in the cerium oxides of the respective examples were darker violet than the color of the reagent in the cerium oxide of the comparative example, in which surface treatment is not performed, and particularly, the cerium oxides of examples 3, 4 and 5 exhibited high antioxidant properties. It may be understood that, as the content of thiourea dioxide introduced to perform surface treatment of cerium oxide is increased, reaction is efficiently performed, the content of trivalent cerium cations ($Ce^{3+}$) on the surface of cerium oxide is increased and thus antioxidant ability of an antioxidant is enhanced.

Further, the cerium oxide of example 5 (use of 5.00 g of thiourea dioxide) exhibited slight decrease in antioxidant ability. It is supposed that the reason for this is that the surface of cerium oxide was coated with an excessive amount of thiourea dioxide and the thickness of such a coating layer degraded radical stabilization reaction of cerium oxide. Otherwise, it is judged that, when a weight of cerium oxide is measured, a weight of a part of thiourea dioxide was included in the weight of cerium oxide and thus an absolute quantity of cerium oxide was reduced. Consequently, it may be understood that a ratio of the content of thiourea dioxide to the weight of cerium oxide may be 5 to 100%, and particularly, 20 to 100% so as to exhibit high antioxidant ability.

Figure 7:
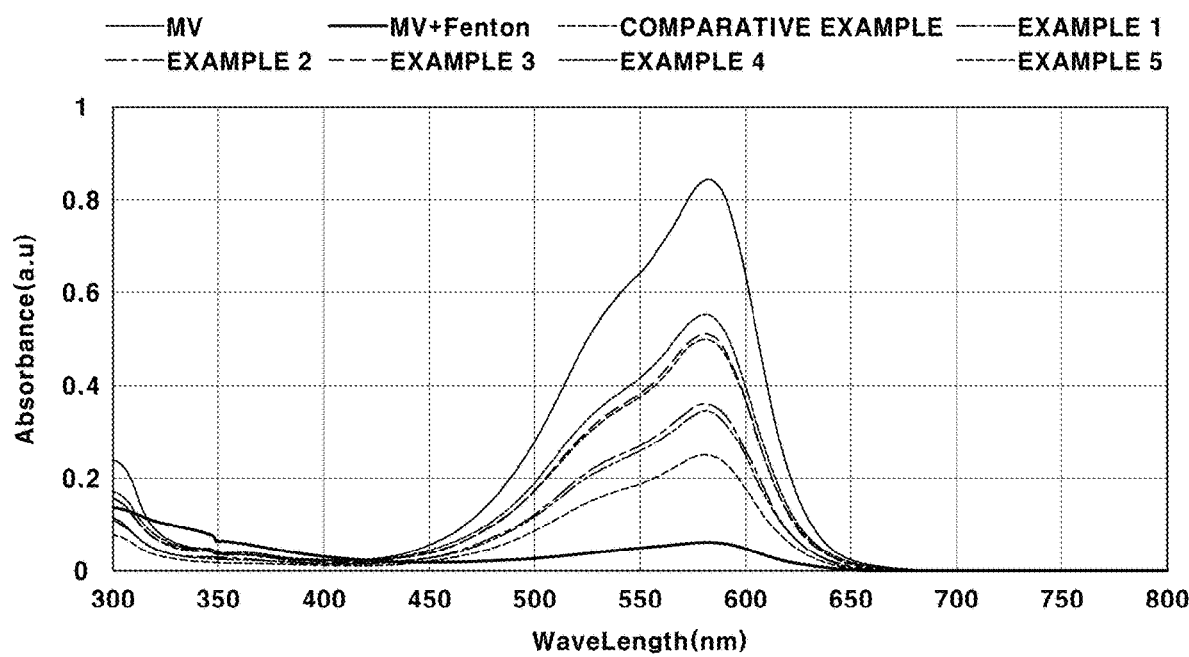
FIG. 7 shows results of evaluation example 3 according to an exemplary embodiment of the present invention.

Evaluation Example 3: Quantitative Evaluation of Antioxidant Abilities of Cerium Oxides According to Thiourea Dioxide Contents As shown in FIG. 7, for quantification of antioxidant abilities of the cerium oxides of the comparative example and the examples, intensities of the violet color of the reagent in evaluation example 2 were quantitatively measured using a UV-vis spectrometer. In this evaluation example, antioxidant abilities of the cerium oxides were compared using the UV-vis spectrometer. Table 1 below represents values at the maximum absorbance.

TABLE

| Classification | MV | MV + Fenton | Comparative example | Example 1 | Example 2 | Example 3 | Example 4 | Example 5 |
|---|---|---|---|---|---|---|---|---|
| Antioxidant content (wt 1% in DI water) | — | — | 0.1 g | 0.1 g | 0.1 g | 0.1 g | 0.1 g | 0.1 g |
| Thiourea dioxide content (wt 2% in DI water) | — | — | 0 g | 0.005 g | 0.01 g | 0.02 g | 0.04 g | 0.1 g |
| Thiourea dioxide content (wt 2% in DI water) | — | — | 0 g | 0.005 g | 0.01 g | 0.02 g | 0.04 g | 0.1 g |

TABLE-continued

| Classification | MV | MV + Fenton | Comparative example | Example 1 | Example 2 | Example 3 | Example 4 | Example 5 |
|---|---|---|---|---|---|---|---|---|
| Content ratio of thiourea dioxide/anti-oxidant (%) | — | — | 0 | 5 | 10 | 20 | 40 | 100 |
| UV-vis result of MV solution (@ 582 nm) | 0.845 | 0.059 | 0.249 | 0.341 | 0.358 | 0.509 | 0.553 | 0.498 |
| Increase or decrease in antioxidant ability relative to comparative example (absorbance) | — | — | — | Increased by 37% | Increased by 44% | Increased by 104% | Increased by 122% | Increased by 100% |

As shown in Table 1 above, it may be understood that the cerium oxides of examples 3 and 5 had antioxidant abilities, which are increased by about 100%, and the cerium oxide of example 4 had antioxidant ability, which is increased by about 120%, relative to the cerium oxide of comparative example.

Evaluation Example 4: Evaluation Antioxidant Abilities of Cerium Oxides According to Surface Treatment Conditions In order to verify properties of cerium oxides according to pH and temperature conditions, a ratio of thiourea dioxide to cerium oxide was fixed to 40% in common (0.04 g of thiourea dioxide/0.1 g of cerium oxide).

In the case of pH conditions, temperature was fixed to 25° C., and a 0.1 M aqueous sulfuric acid solution and a 0.1 M aqueous sodium hydroxide solution were fed to adjust pH conditions when an aqueous thiourea dioxide solution is prepared.

In the case of temperature conditions, pH was fixed 7.

4-1) Evaluation Results According pH Conditions

Antioxidant properties of cerium oxides according to cerium oxide surface treatment conditions using thiourea dioxide were verified by varying pH conditions, and results of verification are represented in Table 2 below.

TABLE 2

| Classification | Manu-facturing condition 1-1 | Manu-facturing condition 1-2 | Manu-facturing condition 1-3 | Manu-facturing condition 1-4 | Manu-facturing condition 1-5 |
|---|---|---|---|---|---|
| pH | 3 | 5 | 7 | 9 | 11 |
| UV-vis result of MV solution (@ 582 nm) | 0.478 | 0.518 | 0.553 | 0.592 | 0.640 |
| Increase or decrease in antioxidant ability relative to manufacturing condition 1-3 (absorbance) | Decreased by 13.6% | Decreased by 6.3% | — | Increased by 7.1% | Increased by 15.7% |

※ Content ratio of thiourea dioxide/cerium oxide is 40% (0.04 g of thiourea dioxide/0.1 g of cerium oxide).
※ Relative increase or decrease in antioxidant ability under respective manufacturing conditions is stated, based on to antioxidant ability under manufacturing condition 1-3 (pH of 7).

As shown in Table 2 above, it may be understood that, as pH increases, a larger content of trivalent cerium cations ($Ce^{3+}$) than tetravalent cerium cations ($Ce^{4+}$) exist on the surface of cerium oxide and thus antioxidant ability of the cerium oxide is increased, and thereby, hydroxyl ions ($OH^-$) play an important role in surface reaction.

On the other hand, cerium oxide exhibited excellent properties under an acid atmosphere, as compared to the comparative example (Table 1). Consequently, since, at a low pH of 3 or lower or a high pH of 11 or greater, there may be difficulty in handling substances in preparation of an antioxidant, it may be determined that pH conditions of 6 to 8, close to neutral conditions, under which a small amount of the antioxidant may exhibit magnificent effects, or weakly basic conditions of pH of 8 to 9 are proper.

4-2) Evaluation Results According to Temperature Conditions

Antioxidant properties of cerium oxides according to cerium oxide surface treatment conditions using thiourea dioxide were verified by varying temperature conditions, and results of verification are represented in Table 3 below.

TABLE 3

| Classification | Manu-facturing condition 2-1 | Manu-facturing condition 2-2 | Manu-facturing condition 2-3 | Manu-facturing condition 2-4 | Manu-facturing condition 2-5 |
|---|---|---|---|---|---|
| Temperature (° C.) | 15 | 25 | 40 | 60 | 80 |
| UV-vis result of MV solution (@ 582 nm) | 0.521 | 0.553 | 0.620 | 0.670 | 0.720 |
| Increase or decrease in antioxidant ability relative to manufacturing condition 2-2 (absorbance) | Decreased by 5.8% | — | Increased by 12.1% | Increased by 21.2% | Increased by 30.2% |

※ Content ratio of thiourea dioxide/cerium oxide is 40% (0.04 g of thiourea dioxide/0.1 g of cerium oxide).
※ Relative increase or decrease in antioxidant ability under respective manufacturing conditions is stated, based on antioxidant ability under manufacturing condition 2-2 (25° C.).

As shown in Table 3 above, it may be understood that, as temperature rises, antioxidant ability of cerium oxide is increased. It may be confirmed that cerium oxide exhibits sufficiently excellent properties even under room temperature conditions, as compared to the comparative example (Table 1). Consequently, a solution may be evaporated under temperature conditions of 80° C. or greater and thus temperature conditions of less than 80° C. are proper, and thus, surface treatment effects are reduced and a cooling process is required under temperature conditions lower than room temperature and thus the temperature conditions lower than room temperature are not proper. Therefore, temperature conditions of room temperature to 80° C., or particularly, temperature conditions of room temperature to 60° C. may be properly used in a preparation process so as to exhibit antioxidant ability.

According to various exemplary embodiments of the present invention, provides is an antioxidant which is surface-treated and a method for preparing the same so as to increase antioxidant ability while having a particle size to secure dissolution stability. Therefore, when the antioxidant is used in an ionomer of an electrolyte membrane or electrodes, performance and chemical durability of a membrane electrode assembly may be enhanced, and thereby, performance and durability of a fuel cell including the membrane electrode assembly may be increased and the lifespan of the fuel cell may be extended.

In addition, an antioxidant for fuel cells according to various exemplary embodiments of the present invention may be surface-treated using a thiourea-based compound to form an outer portion (e.g., shell) including a larger content of a reduced metal oxide than a core, thus increasing antioxidant ability.

Further, the surface-treated antioxidant may have a particle size to secure dissolution stability and simultaneously provide high antioxidant ability.

Further, when the surface-treated antioxidant includes a metal oxide having the same crystal size, the antioxidant may provide excellent antioxidant ability, as compared to other antioxidants.

Moreover, when the antioxidant is used in an ionomer of an electrolyte membrane or an electrode, performance and chemical durability of a membrane electrode assembly may be enhanced, and thereby, performance and durability of a fuel cell including the membrane electrode assembly may be increased and the lifespan of the fuel cell may be extended.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An antioxidant for fuel cells, comprising:
a core comprising one or more selected from the group consisting of a metal oxide and a complex metal oxide and
an outer portion located on a surface of the core and formed and comprising metal cations represented by $M^{(x-n)+}$ wherein n is a natural number of 1 or more and having a smaller oxidation number than a valency of the metal (M) of the core.

2. The antioxidant for fuel cells of claim 1, wherein the metal (M) comprises cerium (Ce); and the core comprises a compound having tetravalent cerium cations ($Ce^{4+}$), and the outer portion comprises a compound having trivalent cerium cations ($Ce^{3+}$).

3. The antioxidant for fuel cells of claim 1, wherein the complex metal oxide comprises one or more selected from the group consisting of cerium zirconium oxide, gadolinium doped cerium oxide, samarium doped cerium oxide, titania-supported cerium oxide and silica-supported cerium oxide.

4. The antioxidant for fuel cells of claim 1, wherein a crystal size of each of the metal oxide and the complex metal oxide is of about 5 nm to 100 nm as being measured by X-ray diffractometry (XRD) or a Brunauer-Emmett-Teller (BET) method.

5. The antioxidant for fuel cells of claim 1, wherein of the antioxidant is formed in agglomerated particles having a size of about 10 nm to 500 nm.

6. The antioxidant for fuel cells of claim 1, wherein the core comprises cerium oxide ($CeO_2$) comprising trivalent cerium cations ($Ce^{3+}$); and the outer portion comprises $Ce_2O_3$ comprising tetravalent cerium cations ($Ce^{4+}$).

7. A membrane electrode assembly comprising:
an electrolyte membrane and electrodes formed on both surfaces of the electrolyte membrane,
wherein at least one of the electrolyte membrane or the electrodes comprises an antioxidant of claim 1.

* * * * *